United States Patent
Wang

(10) Patent No.: US 8,839,040 B2
(45) Date of Patent: Sep. 16, 2014

(54) COMPUTER SYSTEM AND DETECTING-ALARMING METHOD THEREOF

(75) Inventor: Hao-Hao Wang, Shanghai (CN)

(73) Assignee: Inventec Corporation, Taipei (TW)

( * ) Notice: Subject to any disclaimer, the term of this patent is extended or adjusted under 35 U.S.C. 154(b) by 344 days.

(21) Appl. No.: 13/396,164

(22) Filed: Feb. 14, 2012

(65) Prior Publication Data

US 2013/0166894 A1     Jun. 27, 2013

(30) Foreign Application Priority Data

Dec. 21, 2011    (CN) .......................... 2011 1 0433603

(51) Int. Cl.
     *G06F 11/00*      (2006.01)
     *G06F 11/22*      (2006.01)
     *G06F 11/07*      (2006.01)

(52) U.S. Cl.
     CPC ........ *G06F 11/2284* (2013.01); *G06F 11/0751* (2013.01)
     USPC ........................................................... 714/36

(58) Field of Classification Search
     CPC . G06F 11/1417; G06F 11/22; G06F 11/2247; G06F 11/2284; G06F 11/2289; G06F 11/0751
     See application file for complete search history.

(56) References Cited

U.S. PATENT DOCUMENTS

| | | | |
|---|---|---|---|
| 7,657,698 B2 * | 2/2010 | Hawkins | 711/103 |
| 7,945,769 B2 * | 5/2011 | Hong et al. | 713/1 |
| 8,615,685 B2 * | 12/2013 | Zhang | 714/38.13 |
| 2005/0190699 A1 * | 9/2005 | Smith et al. | 370/241 |
| 2007/0157051 A1 * | 7/2007 | Hernandez et al. | 714/1 |
| 2012/0054539 A1 * | 3/2012 | Zhang | 714/6.2 |
| 2012/0079260 A1 * | 3/2012 | Yin et al. | 713/2 |
| 2012/0278653 A1 * | 11/2012 | Cheng et al. | 714/13 |
| 2013/0246001 A1 * | 9/2013 | Uchida | 702/182 |

* cited by examiner

*Primary Examiner* — Michael Maskulinski
(74) *Attorney, Agent, or Firm* — CKC & Partners Co., Ltd.

(57) ABSTRACT

A computer system and a detecting-alarming method thereof are provided. The computer system includes a device and a basic input/output system (BIOS) unit. The BIOS unit has a current device table. The BIOS unit detects the device of the computer system to obtain a detecting result in a start procedure, and compares the detecting result with the current device table. If the detecting result does not match the current device table, the BIOS unit gives an alarm.

20 Claims, 1 Drawing Sheet

COMPUTER SYSTEM AND DETECTING-ALARMING METHOD THEREOF

CROSS-REFERENCE TO RELATED APPLICATION

This application claims the priority benefit of China application serial no. 201110433603.7, filed Dec. 21, 2011. The entirety of the above-mentioned patent application is hereby incorporated by reference herein and made a part of this specification.

BACKGROUND OF THE INVENTION

1. Field of the Invention

The present invention generally relates to an electronic apparatus, in particular, to a computer system capable of detecting devices.

2. Description of Related Art

In a start procedure of a computer system, a basic input/output system (BIOS) unit detects the number and type of central processing units (CPUs), the number, capacity, and frequency of dual in-line memory modules (DIMMs), and the number of hard discs in the system. If at this time, a device is damaged, for example, one of two CPUs is damaged, the BIOS unit cannot detect the damaged CPU at all. As a result, the BIOS unit considers that only one CPU exists and continues the start procedure. It is the same with the DIMMs. A damaged DIMM cannot be detected by the BIOS unit and thus is considered not existent. However, the damaged device actually exists, but cannot be detected only because it is damaged. A user (system manager) cannot know through the start procedure whether any device in the computer system is damaged, so that the damaged device cannot be repaired (or replaced) in time.

SUMMARY OF THE INVENTION

Accordingly, the present invention is directed to a computer system and a detecting-alarming method thereof, in which the computer system is capable of knowing whether an anomaly occurs in any device in a start procedure and giving an alarm when the anomaly occurs.

In an embodiment, the present invention provides a computer system. The computer system includes at least a first device and a basic input/output system (BIOS) unit. The BIOS unit is coupled to the first device. The BIOS unit has a current device table pre-stored therein. The BIOS unit detects the first device of the computer system to obtain a first detecting result in a start procedure, and compares the first detecting result with the current device table. If the first detecting result does not match the current device table, the BIOS unit gives an alarm.

In an embodiment, the present invention provides a detecting-alarming method of a computer system. The detecting-alarming method includes: pre-storing a current device table in a BIOS unit; the BIOS unit detecting a first device of the computer system to obtain a first detecting result in a start procedure; comparing the first detecting result with the current device table; and if the first detecting result does not match the current device table, giving an alarm.

Based on the above, in the embodiments, the present invention provides a computer system for executing a detecting-alarming method. A BIOS unit of the computer system has a current device table pre-stored therein. The BIOS unit detects a first device of the computer system to obtain a first detecting result in a start procedure. It can be known whether an anomaly occurs in any device of the computer system by comparing the first detecting result with the current device table. If the first detecting result does not match the current device table, it indicates that an anomaly occurs in a device of the computer system, and then the BIOS unit gives an alarm.

In order to make the aforementioned features and advantages of the present invention comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
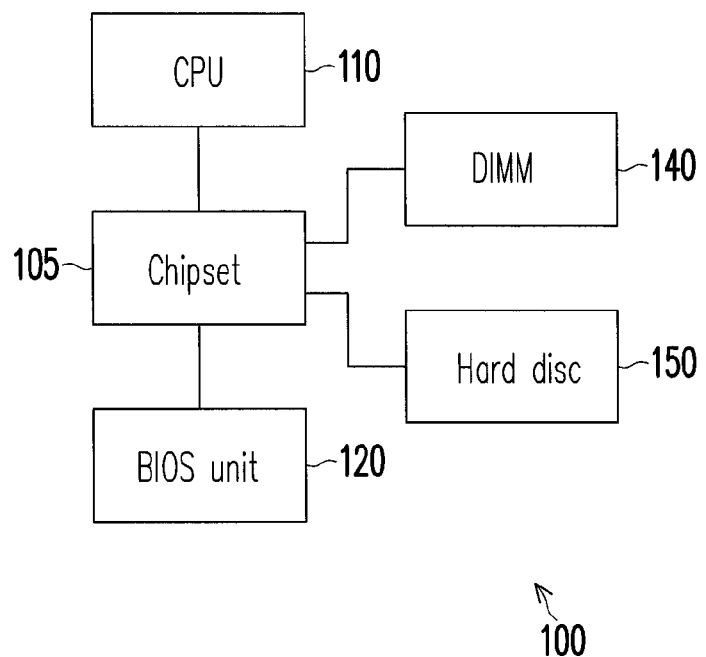
FIG. 1 is a schematic diagram illustrating functional modules of a computer system 100 according to an embodiment of the present invention.

Reference will now be made in detail to the present embodiments of the invention, examples of which are illustrated in the accompanying drawings. Wherever possible, the same reference numbers are used in the drawings and the description to refer to the same or like parts.

FIG. 1 is a schematic diagram illustrating functional modules of a computer system 100 according to an embodiment of the present invention. The computer system 100 includes at least a first device and a basic input/output system (BIOS) unit 120. The BIOS unit 120 has a current device table pre-stored therein. The BIOS unit 120 may be any controller or firmware running a BIOS.

The BIOS unit 120 is coupled to the first device. The BIOS unit 120 detects the first device of the computer system 100 to obtain a first detecting result in a start procedure (or power on procedure). The first device includes a central processing unit (CPU) 110, a dual in-line memory module (DIMM) 140, a hard disc 150, and/or other internal devices of the computer system. This embodiment further includes a chipset 105. The BIOS unit 120 is coupled to the CPU 110, the DIMM 140, the hard disc 150, and other first devices through the chipset 105.

The start procedure (or power on procedure, or boot procedure, or initial procedure) includes a power on self test (POST). The BIOS unit 120 may detect the first device of the computer system 100 to obtain the first detecting result in the POST stage. For example, the BIOS unit 120 may detect the number and type of the CPUs 110, the number, capacity, and frequency of the DIMMs 140, and the number and capacity of the hard discs 150 in the computer system 100 in the POST stage.

It is assumed herein that the computer system 100 has two CPUs 110. Therefore, the number and other information of the CPUs 110 may be recorded in the current device table in advance. If at this time, a device of the computer system 100 is damaged, for example, one of the two CPUs 110 is damaged, the BIOS unit 120 cannot detect the damaged CPU. Therefore, the first detecting result obtained by detecting of the BIOS unit 120 shows that the computer system 100 has only one CPU. The BIOS unit 120 may compare the first detecting result with the content of the current device table. Since the CPU number shown in the first detecting result does not match the CPU number recorded in the current device table, it indicates that an anomaly occurs in one of the CPUs 110, and then the BIOS unit 120 may give an alarm.

The manner for the BIOS unit 120 to give the alarm is not limited in this embodiment. For example, the BIOS unit 120 may give the alarm by displaying information on a screen, driving light signal hardware, driving sound hardware, creating an alarm log, or by any other means capable of notifying a user (system manager).

The content of the current device table in the BIOS unit 120 may depend on actual design requirements, and/or fields of the current device table depend on data attributes obtained by the BIOS unit 120 detecting the computer system 100. For example, in some embodiments, the current device table may include a device type field and a number field. In this embodiment, the current device table includes a device type field, a characteristic field, and a number field. For example, taking the CPU 110 as an example, the device type "CPU" and/or processor serial number "i5-2500K" may be filled in the device type field of the current device table, the frequency/speed "3.30 GHz", cache "6.0 MB", core number "4", and/or number "4" of threads of execution may be filled in the characteristic field, and the CPU number "2" may be filled in the number field. Taking the DIMM 140 as an example, the device type "DIMM" and/or product serial number "KHX1600C9S3K2/4GX" may be filled in the device type field of the current device table, the capacity "4 GB" and/or voltage "1.5 V" may be filled in the characteristic field, and the DIMM number "2" may be filled in the number field. Further, taking the hard disc 150 as an example, the device type "HDD" and/or product serial number "7K3000" may be filled in the device type field of the current device table, the size "3.5", capacity "1.5 TB", rotation speed "7200", and/or interface specification "SATA" may be filled in the characteristic field, and the hard disc number "4" may be filled in the number field.

Taking the CPU as an example, the processor serial number "i5-2500K" may be filled in the device type field of the current device table, the frequency/speed "3.30 GHz" may be filled in the characteristic field, and the CPU number "2" may be filled in the number field. If the BIOS unit 120 finds by comparison that the first detecting result does not match the content of the current device table, the BIOS unit 120 gives an alarm. For example, the first detecting result shows that the processor serial number of the CPU is "i3-2330M", while the content of the device type field of the current device table is "i5-2500K", showing that the CPU may be illegally replaced, so the BIOS unit 120 gives an alarm. For another example, the first detecting result shows that the frequency/speed of the CPU is "2.2 GHz", while the content of the characteristic field of the current device table is "3.30 GHz", showing that the CPU may be illegally replaced or the system configuration may be illegally changed, so the BIOS unit 120 gives an alarm. For still another example, the first detecting result shows that the CPU number is "1", while the content of the number field of the current device table is "2", showing that the CPU may be illegally stolen or one CPU may be failed, so the BIOS unit 120 gives an alarm.

For the current device table in the BIOS unit 120, a manufacturer may fill relevant data in a current device table according to device configuration of an actual product in advance before delivery of the product, and record the current device table in the BIOS unit 120. In this embodiment, the current device table is created by the BIOS unit 120. For example, the BIOS unit 120 of the computer system 100 may provide the following configuration interface to enable a user to set system configuration information. When the display screen enters the following BIOS configuration interface, the BIOS unit 120 may pre-fill the detected information, which only needs to be confirmed by the user directly.

"SKU config check" [disable|enable]
CPU count [integer]
CPU frequence [integer] MHz
Memory count [integer]
Memory size [integer] GB
IPMI sensor check [enable/disable]
. . .

In other embodiments, the current device table may be created/modified by an application program in an operating system (OS). Configuration information of the current device table may be read and written in the OS by special tools related to the BIOS, so as to enable the user to perform the same operation on a large number of servers or personal computers (PCs) conveniently.

After giving the alarm, the BIOS unit 120 may end the start procedure of the computer system 100 or continue the start procedure according to presetting of the user. For example, taking the DIMM 140 as an example, the capacity "4 GB" may be filled in the characteristic field of the current device table, while the user may preset a threshold to 2 GB. The threshold represents the minimum capacity of memory required for normal operation of the computer system 100. If the first detecting result shows that the capacity of the DIMM 140 is "3 GB" (not matching the content of the characteristic field of the current device table), the BIOS unit 120 gives an alarm. After giving the alarm, since the capacity (3 GB) of the DIMM 140 is greater than the preset threshold (2 GB), the BIOS unit 120 may continue the start procedure of the computer system 100. For another example, if the first detecting result shows that the capacity of the DIMM 140 is "1 GB" (not matching the content of the characteristic field of the current device table), the BIOS unit 120 gives an alarm. After giving the alarm, since the capacity (1 GB) of the DIMM 140 is smaller than the preset threshold (2 GB), the BIOS unit 120 may end the start procedure of the computer system 100.

For still another example, after giving the alarm, the BIOS unit 120 may decide whether to end the start procedure of the computer system 100 or continue the start procedure according to the type of the apparatus. For example, if the first detecting result shows that the specification or number of the hard discs 150 does not match the relevant content of the current device table, the BIOS unit 120 may continue the start procedure of the computer system 100 after giving the alarm. If the first detecting result shows that the specification or number of the CPUs 110 does not match the relevant content of the current device table, the BIOS unit 120 may end the start procedure of the computer system 100 after giving the alarm.

Figure 2:
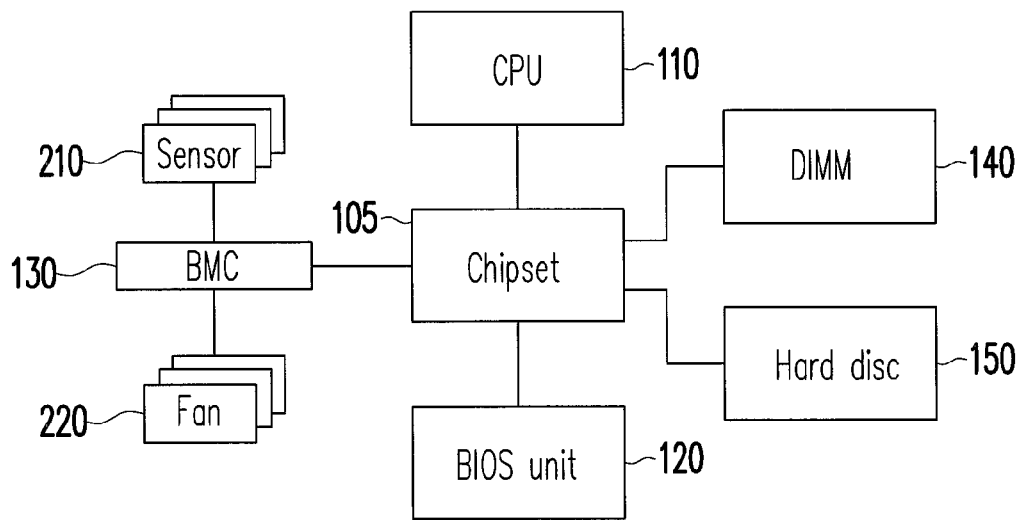
FIG. 2 is a schematic diagram illustrating functional modules of a computer system 200 according to another embodiment of the present invention.

FIG. 2 is a schematic diagram illustrating functional modules of a computer system 200 according to another embodiment of the present invention. For the embodiment shown in FIG. 2, reference can be made to the relevant description of FIG. 1. The difference from the computer system 100 shown in FIG. 1 lies in that the computer system 200 further includes a baseboard management controller (BMC) 130. In other embodiments, the BMC 130 may be replaced by a keyboard controller (KBC), an embedded controller (EC), or other types of controllers/microprocessors. The BMC 130 is responsible for managing a sensor 210, a fan 220, and/or other baseboard components of the computer system 200. In this embodiment, the sensor 210 may be an intelligent platform management interface (IPMI) sensor.

After the computer system 200 is powered on, the BMC 130 can operate normally, no matter whether the OS or the BIOS unit 120 of the computer system 200 is started. In this embodiment, the BMC 130 can detect at least a second device of the computer system 200 to obtain a second detecting result before and/or during the start procedure after the computer system 200 is powered on. The BMC 130 is coupled to the BIOS unit 120. The BMC 130 still can detect the second device of the computer system 200 to obtain the second detecting result during, for example, normal operation or shut-down, in addition to the BIOS start (initialization). The BMC 130 is started before the BIOS unit 120, for detecting the second device (for example, the sensor 210 and/or the fan 220) of the computer system 200 to obtain the second detecting result. The BIOS unit 120 detects a first device (for example, the CPU 110, the DIMM 140, the hard disc 150, etc.) of the computer system 200 to obtain a first detecting result in a start procedure (for example, a POST, procedure). The BIOS unit 120 may access the BMC 130 to obtain the second detecting result and add the second detecting result to the first detecting result. Therefore, the BIOS unit 120 may compare the first detecting result with the content of the current device table. If the first detecting result does not match the content of the current device table, the BIOS unit 120 may give an alarm.

For example, when the BIOS is started, the BIOS unit 120 detects the first device of the computer system 200 to obtain the first detecting result, and meanwhile the BMC 130 also detects the second device of the computer system 200 to obtain the second detecting result. The BIOS unit 120 may send a command to the BMC 130 to obtain relevant configuration information (i.e., the second detecting result), for example, the number of the sensors 210 and the number of the fans 220 controlled by the BMC 130. The BIOS unit 120 adds the second detecting result of the BMC 130 to the first detecting result. Therefore, the BIOS unit 120 may compare the gathered first detecting result with the content of the current device table. If any content does not match, the BIOS unit 120 considers that something is wrong with the corresponding device, and thus the BIOS unit 120 may output relevant information on the screen or drive hardware (for example, an LED or buzzer) to give an alarm.

Or, the manner for the BIOS unit 120 to give the alarm includes creating an alarm log in the BMC 130, so that a remote user can read the alarm log of the computer system 200 from the BMC 130 through a network.

Based on the above embodiments, a detecting-alarming method of the computer system is described herein. The detecting-alarming method includes: the BIOS unit 120 detecting a first device of the computer system to obtain a first detecting result in a start procedure; comparing the first detecting result with a current device table of the BIOS unit 120; and if the first detecting result does not match the current device table, giving an alarm.

In some embodiments, the start procedure may include a POST. The current device table may include a device type field, a characteristic field, and a number field. The manner of giving the alarm includes displaying information on a screen, driving light signal hardware, driving sound hardware, or creating an alarm log. The current device table may be created by the BIOS unit, or the current device table may be created by an application program in an OS.

According to the actual design and specification of the computer system, the first device may include a DIMM 140, a CPU 110, or a hard disc (HDD) 150. In some other embodiments, the computer system further includes a BMC 130. The BMC 130 detects a second device (for example, a sensor 210, a fan 220, etc.) of the computer system to obtain a second detecting result in the start procedure. The BIOS unit 120 adds the second detecting result to the first detecting result, then compares the first detecting result with the current device table of the BIOS unit 120, and gives an alarm. In other embodiments, the manner of giving the alarm includes creating an alarm log in the BMC 130 for a remote management apparatus to read the alarm log. The remote management apparatus may access the BMC 130 and read the alarm log of the BMC 130 through a management network, for example, Ethernet. Therefore, the remote management apparatus can monitor/manage a plurality of computer systems more quickly and conveniently.

In view of the above, in the embodiments, the present invention provides the computer system for executing a detecting-alarming method. The BIOS unit 120 of the computer system has a current device table pre-stored therein. The BIOS unit 120 and the BMC 130 detect devices of the computer system to obtain a detecting result in a start procedure. It can be known whether an anomaly occurs in any device of the computer system by comparing the detecting result with the current device table of the BIOS unit 120. If the detecting result does not match the current device table, it indicates that an anomaly occurs in a device of the computer system, and then the BIOS unit 120 gives an alarm to notify the user (system manager) of performing corresponding processing in time.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following, claims and their equivalents.

What is claimed is:

1. A computer system, comprising:
at least a first device; and
a basic input/output system (BIOS) unit, coupled to the first device, wherein the BIOS unit has a current device table pre-stored therein, detects the first device of the computer system to obtain a first detecting result in a start procedure, compares the first detecting result with the current device table, and gives an alarm if the first detecting result does not match the current device table.

2. The computer system according to claim 1, wherein the current device table comprises a device type field, a characteristic field, and a number field; the first detecting result comprises the type, characteristic and number of the first device; and the alarm is given if the type of the first device does not match the content of the device type field, or the characteristic of the first device does not match the content of the characteristic field, or the number of the first device does not match the content of the number field.

3. The computer system according to claim 1, wherein a manner for the BIOS unit to give the alarm comprises displaying information on a screen, driving light signal hardware, driving sound hardware, or creating an alarm log.

4. The computer system according to claim 1, wherein after giving the alarm, the BIOS unit ends the start procedure of the computer system or continues the start procedure according to presetting of a user.

5. The computer system according to claim 1, wherein the current device table is created by the BIOS unit, or the current device table is created by an application program in an operating system.

6. The computer system according to claim 1, wherein the first device comprises a dual in-line memory module, a central processing unit, or a hard disc.

7. The computer system according to claim 1, wherein the computer system further comprises:
   at least a second device; and
   a baseboard management controller (BMC), coupled to the second device and the BIOS unit, wherein the BMC is started before the BIOS unit, for detecting the second device of the computer system to obtain a second detecting result,
   wherein the BIOS unit accesses the BMC to obtain the second detecting result, and adds the second detecting result to the first detecting result.

8. The computer system according to claim 7, wherein the BMC detects the second device of the computer system to obtain the second detecting result after the computer system is powered on, before the start procedure, and/or during the start procedure.

9. The computer system according to claim 7, wherein the second device comprises a sensor or a fan.

10. The computer system according to claim 7, wherein a manner for the BIOS unit to give the alarm comprises creating an alarm log in the BMC for a remote management apparatus to read the alarm log.

11. A detecting-alarming method of a computer system, comprising:
   pre-storing a current device table in a basic input/output system (BIOS) unit;
   the BIOS unit detecting a first device of the computer system to obtain a first detecting result in a start procedure;
   comparing, by the BIOS unit, the first detecting result with the current device table; and
   giving, by the BIOS unit, an alarm if the first detecting result does not match the current device table.

12. The detecting-alarming method according to claim 11, wherein the current device table comprises a device type field, a characteristic field, and a number field.

13. The detecting-alarming method according to claim 11, wherein a manner of giving the alarm comprises displaying information on a screen, driving light signal hardware, driving sound hardware, or creating an alarm log.

14. The detecting-alarming method according to claim 11, wherein the detecting-alarming method further comprises: after giving the alarm, ending the start procedure of the computer system or continuing the start procedure according to presetting of a user.

15. The detecting-alarming method according to claim 11, wherein the detecting-alarming method further comprises:
   creating the current device table by the BIOS unit, or creating the current device table by an application program in an operating system.

16. The detecting-alarming method according to claim 11, wherein the first device comprises a dual in-line memory module, a central processing unit, or a hard disc.

17. A detecting-alarming method of a computer system, comprising:
   pre-storing a current device table in a basic input/output system (BIOS) unit;
   starting a baseboard management controller (BMC) before the BIOS unit, for detecting a second device of the computer system to obtain a second detecting result;
   the BIOS unit detecting a first device of the computer system to obtain a first detecting result in a start procedure;
   accessing the BMC to obtain the second detecting result;
   adding the second detecting result to the first detecting result;
   comparing the first detecting result with the current device table; and
   giving an alarm if the first detecting result does not match the current device table.

18. The detecting-alarming method according to claim 17, wherein the BMC detects the second device of the computer system to obtain the second detecting result after the computer system is powered on, before the start procedure, and/or during the start procedure.

19. The detecting-alarming method according to claim 17, wherein the second device comprises a sensor or a fan.

20. The detecting-alarming method according to claim 17, wherein a manner of giving the alarm comprises creating an alarm log in the BMC for a remote management apparatus to read the alarm log.

* * * * *